Dec. 28, 1948.  F. NEWTON  2,457,708
HYDRAULIC DAMPER
Filed July 16, 1947
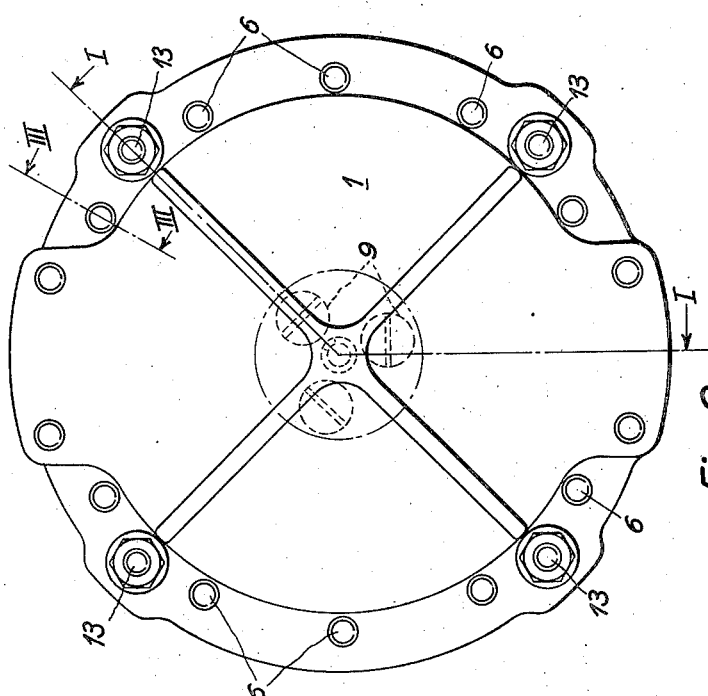
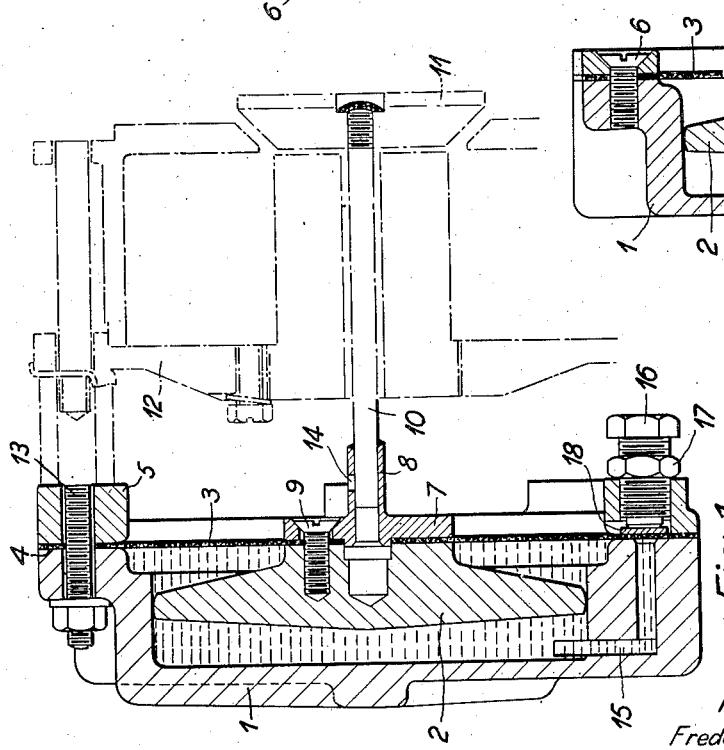
INVENTOR
Frederick Newton
BY [signature]
Attorney

UNITED STATES PATENT OFFICE

2,457,708
HYDRAULIC DAMPER

Frederick Newton, Sudbury, England, assignor to Newton Brothers (Derby) Limited, Derby, England, a British company Application July 16, 1947, Serial No. 761,361
In Great Britain September 11, 1946

2 Claims. (Cl. 188—97)

This invention is a liquid-filled dash-pot devoid of any gland and substantially incapable of loss of liquid by leakage or evaporation. It comprises a metal cylinder closed at one end and sealed at the open end by a diaphragm of flexible material impervious and resistant to the liquid in the dash-pot, and a piston closely fitting the cylinder, preferably having a spherical edge of the radius of the cylinder, and secured in a liquid-tight fashion to the diaphragm.

The dash-pot can be made adjustable by provision of an adjustable leak connecting the two ends of the cylinder, permitting liquid to pass from one side of the piston to the other without penetrating between the piston and the cylinder. The leak is afforded by a passage in the cylinder wall leading from the interior at the closed end of the cylinder and opening on the end surface of the cylinder wall; the opening is nearly closed by the diaphragm which is held tight upon the cylinder end throughout its periphery, but not over the area about the mouth of the passage, by a clamping ring, a leak limiter being provided, adjustable in the clamping ring, to limit and vary the extent to which the diaphragm can lift from the area about the mouth of the passage.

The dash-pot is especially of value for damping movements which extend over only a small range, for which purpose the cylinder needs to be of large diameter relatively to its length. An instance is the damping of electric regulators, such as are described in United States Patent No. 2,268,718, issued January 6, 1942, in which a carbon pile is subjected to the pressure of a spring opposed by the pull of an electromagnet upon its armature; by attaching the magnet armature to the piston of such a dash-pot vibration attributable to the alternating current excitation of the magnet may be eliminated.

A construction of dash-pot according to the invention is shown in the accompanying drawing.

Figure 1 is an axial section of the dash-pot on the line I—I of Figure 2, and shows its attachment to an electric regulator;

Figure 2 is an end view of the dash-pot;

Figure 3 is a fragmentary section on the line III—III of Figure 2.

The dash-pot vessel is a shallow cylinder 1 of relatively large diameter closed at one end. In it moves a piston 2, the edge of which may with advantage be rounded, preferably to the radius of the cylinder, so that it can tilt without jamming. The open end of the cylinder is sealed by a flexible diaphragm 3 which is clamped upon the end face 4 of the cylinder throughout its periphery by a clamping ring 5 attached to the cylinder by set screws 6. The piston 2 is attached to the diaphragm in liquid-tight fashion, the inner edge of the diaphragm being clamped between the face of the piston and the flange 7 of a ferrule 8 which is fastened to the piston by set screws 9.

The diaphragm 3 may be of any flexible material impervious to and not attacked by the liquid used. For an oil-filled dash-pot neoprene is suitable.

The ferrule 8 is shown attached by a rod 10 to the armature 11 of an electromagnet 12 forming part of an electric regulator of the kind above mentioned; the electromagnet is attached to the cylinder 1 by studs 13. In assembly the dash-pot is first attached to the magnet casing, and the rod 10 secured to the armature slides freely in the ferrule in the wall of which is an opening 14. The piston 2 is moved to mid position, that is to the middle of its intended stroke, and is then soldered to the ferrule 8.

To permit the dash-pot being adjusted a passage 15 is formed in the wall of the cylinder 1 leading from the interior at the closed end and opening on the face 4 of the cylinder end beneath the diaphragm 3. As appears from Figure 1 the clamping surface of the clamping ring is relieved over the mouth of the passage 15 and the area immediately surrounding it, so that the diaphragm can lift from that area under the pressure of the liquid when pressure is exerted on the piston 2. The extent to which the diaphragm can thus lift is determined by a leakage limiter which, in the construction illustrated, takes the form of a set screw 16 with lock nut 17, screwing through the clamping ring and bearing, when screwed home, upon a metal plate 18 covering the area of the diaphragm opposite and around the mouth of the passage 15. By adjustment of this set screw the freedom of movement of the piston 2 can be diminished or increased at will. It is to be noted that this adjustable leak affords no possibility of leakage of liquid out of the dash-pot.

With this arrangement the return of the piston when the pressure on it is relieved will be slow. It can be hastened by providing a spring beneath the part of the diaphragm covering the mouth of the passage 15 to lift the diaphragm as far as set screw 16 permits.

I claim:

1. A liquid filled dash-pot comprising a metal cylinder closed at one end, having a passage in its wall leading from the interior at the closed end to a mouth in the end of the cylinder wall, a diaphragm of flexible material impervious and resistant to the liquid in the dash-pot sealing the open end of the cylinder, a clamping ring pressing said diaphragm upon the open end of the cylinder throughout the periphery of the diaphragm but not over the area around the mouth of the passage, a piston fitting the cylinder and attached in liquid-tight fashion to the diaphragm, and a leak limiter adjustable in the clamping ring to limit and vary the extent to which the diaphragm can lift from the area about the mouth of the passage.

2. A liquid-filled dash-pot according to Claim 1 in which the leak limiter is a set screw with lock nut, screwing through the clamping ring and bearing upon a metal plate upon the diaphragm over and about the mouth of the passage.

FREDERICK NEWTON.

REFERENCES CITED

The following references are of record in the file of this patent:

UNITED STATES PATENTS

| Number | Name | Date |
|---|---|---|
| 491,794 | Barker | Feb. 14, 1893 |
| 2,112,059 | Arthur | Mar. 22, 1938 |
| 2,283,682 | Marshall | May 19, 1942 |